US010000715B2

United States Patent
Kumar et al.

(10) Patent No.: US 10,000,715 B2
(45) Date of Patent: *Jun. 19, 2018

(54) CATALYTIC DEPOLYMERISATION OF POLYMERIC MATERIALS

(71) Applicant: Greenmantra Recycling Technologies Ltd., Brantford (CA)

(72) Inventors: Anil Kumar, Kanpur Uttar Pradesh (IN); Pushkar Kumar, Toronto (CA)

(73) Assignee: GREENMANTRA RECYCLING TECHNOLOGIES LTD., Brantford (CA)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/761,779

(22) PCT Filed: Jan. 17, 2013

(86) PCT No.: PCT/CA2013/000041
§ 371 (c)(1),
(2) Date: Jul. 17, 2015

(87) PCT Pub. No.: WO2014/110644
PCT Pub. Date: Jul. 24, 2014

(65) Prior Publication Data
US 2015/0361374 A1    Dec. 17, 2015

(51) Int. Cl.
*C10M 107/02* (2006.01)
*C08J 11/10* (2006.01)
(Continued)

(52) U.S. Cl.
CPC ............. *C10M 107/02* (2013.01); *C08F 8/50* (2013.01); *C08J 11/10* (2013.01); *C10G 1/10* (2013.01);
(Continued)

(58) Field of Classification Search
CPC .. C10G 1/10; C08J 11/10; C08J 11/16; C07C 4/22; Y02W 30/705; B01J 27/14;
(Continued)

(56) References Cited

U.S. PATENT DOCUMENTS 3,332,926 A    7/1967  Baron, Jr. et al.
3,345,352 A   10/1967  Baron et al.
(Continued)

FOREIGN PATENT DOCUMENTS

CA    2098778 A1    12/1993
CA    2202941 A1    10/1998
(Continued)

OTHER PUBLICATIONS

Extended European Search Report issued in European Application No. 10172039.9, dated Apr. 15, 2011 (7 pages).
(Continued)

*Primary Examiner* — Philip Y Louie
*Assistant Examiner* — Aaron W Pierpont
(74) *Attorney, Agent, or Firm* — Corridor Law Group, P.C.

(57) ABSTRACT

A process for converting a molten polymeric material is provided. The process includes effecting disposition of a molten polymeric material, having at least one carbon-carbon double bond, in sufficient proximity to a catalyst material within a reaction zone, to effect a reactive process that effects generation of a reaction product. The reactive process effects cleaving of at least one carbon-carbon double bond. The catalyst material includes [Fe—Cu—Mo—P]/$Al_2O_3$ prepared by binding a ferrous-copper complex to an alumina support to generate an intermediate material, and reacting the intermediate material with a heteropolyacid.

23 Claims, 10 Drawing Sheets

(51) Int. Cl.
*C08F 8/50* (2006.01)
*C10G 1/10* (2006.01)

(52) U.S. Cl.
CPC ......... *C08J 2323/06* (2013.01); *Y02W 30/702* (2015.05)

(58) Field of Classification Search
CPC ...... B01J 27/16; B01J 27/1817; B01J 27/185; B01J 27/1853; B01J 27/19; B01J 21/04; B01J 23/72; B01J 23/811; B01J 23/885; B01J 2531/842; B01J 23/70; C08F 8/50; G10G 1/10
USPC .................................. 585/241, 832; 502/211
See application file for complete search history.

(56) References Cited

U.S. PATENT DOCUMENTS

| | | | |
|---|---|---|---|
| 3,441,628 | A | 4/1969 | Ratzsch et al. |
| 4,642,401 | A | 2/1987 | Coenen et al. |
| 5,158,982 | A | 10/1992 | Stapp |
| 5,354,930 | A | 10/1994 | Atkins et al. |
| 5,369,215 | A | 11/1994 | Platz |
| 5,386,055 | A | 1/1995 | Lee et al. |
| 5,728,909 | A | 3/1998 | Butcher, Jr. |
| 5,731,483 | A | 3/1998 | Stabel et al. |
| 5,821,395 | A | 10/1998 | Price et al. |
| 5,849,964 | A | 12/1998 | Holighaus et al. |
| 6,143,940 | A | 11/2000 | Miller et al. |
| 6,150,577 | A | 11/2000 | Miller et al. |
| 6,172,271 | B1 | 1/2001 | Horizoe et al. |
| 6,184,427 | B1 | 2/2001 | Klepfer et al. |
| 6,288,296 | B1 | 9/2001 | Miller et al. |
| 6,822,126 | B2 | 11/2004 | Miller |
| 7,834,226 | B2 | 11/2010 | Miller |
| 7,893,307 | B2 | 2/2011 | Smith |
| 8,168,839 | B2 | 5/2012 | Niu |
| 8,664,458 | B2 * | 3/2014 | Kumar ................. C10G 1/10 201/21 |
| 9,200,130 | B2 | 12/2015 | D'Amato et al. |
| 2003/0199718 | A1 | 10/2003 | Miller |
| 2005/0148487 | A1 | 7/2005 | Brownscombe et al. |
| 2012/0016169 | A1* | 1/2012 | Kumar ................. C10G 1/10 585/241 |
| 2013/0303810 | A1 | 11/2013 | Handerek |
| 2014/0046102 | A1 | 2/2014 | D'Amato et al. |
| 2014/0182194 | A1 | 7/2014 | Unger et al. |
| 2015/0361374 | A1 | 12/2015 | Kumar et al. |

FOREIGN PATENT DOCUMENTS

| | | |
|---|---|---|
| CA | 2805570 A1 | 1/2012 |
| CA | 2822678 A1 | 2/2014 |
| CA | 2898257 A1 | 7/2014 |
| CA | 2822678 C | 5/2017 |
| CH | 646717 A5 | 12/1984 |
| CN | 1120347 A | 4/1996 |
| CN | 201180034887 A1 | 4/2015 |
| DE | 1570194 A1 | 8/1969 |
| DE | 3642273 A1 | 4/1987 |
| DE | 69323125 | 3/1999 |
| DE | 69323125 T2 | 8/1999 |
| EP | 0577279 A1 | 1/1994 |
| EP | 0717094 A1 | 6/1996 |
| EP | 0577279 B1 | 1/1999 |
| EP | 1707614 A1 | 10/2006 |
| GB | 1310260 A | 3/1973 |
| JP | H04-57887 A | 2/1992 |
| JP | H06-179877 A | 6/1994 |
| JP | H08-508520 A | 9/1996 |
| JP | H08-253601 A | 10/1996 |
| JP | 2000-512209 A | 9/2000 |
| JP | 2002-167466 A | 6/2002 |
| JP | 2002-256103 A | 9/2002 |
| JP | 2005-170986 A | 6/2005 |
| JP | 2005-200573 A | 7/2005 |
| JP | 2005-527672 A | 9/2005 |
| JP | 2006-056957 A | 3/2006 |
| JP | 2006-143802 A | 6/2006 |
| JP | 2007-529574 A | 10/2007 |
| WO | 2014110644 A1 | 7/2014 |
| WO | 2017113020 A1 | 7/2017 |

OTHER PUBLICATIONS

Office Action issued in Chinese application No. 2015101262909, dated Feb. 29, 2016 (11 pages).
Office Action issued in Chinese application No. 201180034887.0, dated Apr. 4, 2014 (9 pages).
Office Action issued in Japanese application No. 2013-519172, dated Jun. 16, 2015 (20 pages).
Office Action issued in Malaysian application No. PI 2013000128, dated Oct. 15, 2015 (3 pages).
Office Action issued in U.S. Appl. No. 12/836,594, dated Jun. 13, 2013 (10 pages).
Lal S et al: "Depolymerization of HDPE to wax in the presence of a catalyst formed by homonuclear macrocyclic zirconium complex chemically bonded to alumina support", Applied Catalysis A: General Elsevier Science, vol. 303, No. 1, Apr. 18, 2006, pp. 9-17 (9pages).
International Search Report and Written Opinion dated Sep. 20, 2013, by the Canadian Intellectual Property Office in corresponding International Application No. PCT/CA2013/000041 (9 pages).
Predel, M., "Pyrolysis of mixed polyolefins in a fluidised-bed reactor and on a pyro-GC/MS to yield aliphatic waxes"; Polymer Degradation and Stability, vol. 70, No. 3 (2000); pp. 373-385.
Arabiourrutia, M., "Characterization of the waxes obtained by the pyrolysis of polyolefin plastics in a conical spouted bed reactor"; Journal of Analytical and Applied Pyrolysis, vol. 94 (2012); pp. 230-237.
Murty et al., Thermal Degradation /Hydrogenation of Commodity Plastics and Characterization of their Liquefaction Products, Fuel Processing Technology, Oct.-Dec. 1996, pp. 75-90, vol. 49, Issues 1-3.
Weibing et al., Thermal and catalytic degradation of high density polyethylene and commingled post-consumer plastic waste, Fuel Processing Technology, Mar. 1997, pp. 47-62, vol. 51, Issues 1-2.
Uddin et al., Catalytic Degradation of Polyethylene and Polypropylene into Liquid Hydrocarbons with Mesoporous Silica, Microporous and Mesoporous Materials, May 1998, pp. 557-564, vol. 21, Issues 4-6.
Buekens et al., Catalytic plastics cracking for recovery of gasoline-range hydrocarbons from municipal plastic wastes, Resources, Conservation and Recycling, Aug. 1998, pp. 163-181, vol. 23, Issue 3.
Luo et al., Catalytic degradation of high density polyethylene and polypropylene into liquid fuel in a power-particle fluidized bed, Polymer Degradation and Stability, online Aug. 21, 2000; pp. 97-102, vol. 70, Issue 1.
You et al., Liquid-phase catalytic degradation of polyethylene wax over silica modified zeolite catalysts, Polymer Degradation and Stability, May 2001, pp. 329-336, vol. 265, Issue 2.
Seo et al., Investigation of Catalytic degradation of HDPE by hydrocarbon group type analysis, Journal of Analytical and Applied Pyrolysis, online Jan. 21, 2003, pp. 97-102, vol. 70, Issue 2.
Lai et al., Development of heterogeneous catalyst by ionically bonding macrocyclic Zr—Zr complex to montmorillonite clay for depolymerization of polypropylene, Journal of Molecular Applied Catalysis A: Chemical, Apr. 16, 2007, pp. 15-24, vol. 265, Issues 1-2.
PCT International Preliminary Report on Patentability dated Aug. 1, 2012, in related International Application No. PCT/IB2011/001642.
EPO Communication pursuant to Article 94(3) EPC (Office Action) dated Oct. 16, 2012, in related European Patent Application No. EP-10172039.9-2104.

(56) References Cited

OTHER PUBLICATIONS

International Preliminary Report on Patentability dated Jul. 21, 2015, in connection with International Application PCT/CA2013/000041.
Office Action issued in Chinese Application No. 201510126290, dated Feb. 29, 2016.
Office Action issued in Canadian Application No. 2805570, dated Oct. 5, 2016.
Office Action issued in Canadian Application No. 2898257, dated Oct. 6, 2016.
International Preliminary Report on Patentability dated Mar. 17, 2017 in connection with International Application PCT/CA2016/051555.
Aboulkas, Thermal degradation behaviors of polyethylene and polypropylene. Part 1: Pyrolysis kinetics and mechanisms, Energy Conversion and Management, Jan. 20, 2010, pp. 1363-1369, vol. 51, Elsevier Ltd.
Teh, A Review of Polyethylene-Polypropylene Blends and Their Compatiblization, Advances in Polymer Technology, 1994, pp. 1-23, vol. 13, No. 1, John Wiley & Sons, Inc.
Xanthos, Recycling of the #5 Polymer, Science, Aug. 10, 2012, pp. 700-702, vol. 337.
Yu, Peroxide Modified Polyolefin Blends: Part 1. Effects on LDPE/PP. Blends with Components with Similar Initial Viscosities, Advances in Polymer Technology, 1990, pp. 163-172, vol. 10, No. 3, John Wiley & Sons, Inc.

\* cited by examiner

Fig. 10

| Expt# | Max heater temp (°C) | Max process temp (°C) | Baseline pressure (psi) | Max pressure (psi) | Heating to setpoint 375°C (min) | rxn time (375-375) (min) | Vent headspace (°C) | Cooling time (min) | Wax yield (g) |
|---|---|---|---|---|---|---|---|---|---|
| DD2-55 | 450 | 387 | 20 | 92 | 130 | 25 | N/A | | 384 |
| DD2-56 | 450 | 381 | 15 | 61 | 120 | 15 | 300 | | 430 |
| DD2-57 | 450 | 389 | 10 | na | 110 | 18 | na | | |
| DD2-58 | 450 | 380 | 30 | 80 | 115 | 10 | 360 | | 416 |

| Oil yield (g/ml) | Total mass bal. (%) | Notes | M.P. | Colour (A-D) | Penetration (dmm) | Viscosity temp | Viscosity cp | Density | Odour |
|---|---|---|---|---|---|---|---|---|---|
| 1 | 85.90604 | | 130 | | 1.0 | 140 | 134.0 | | |
| 3 | 94.29825 | | 130 | | 1.0 | 140 | 450.0 | | |
| | | | 128 | | 1.0 | 140 | 172.0 | | |
| 6 | 99.5283 | | 131 | | 1.0 | 140 | 2,000.0 | | |

CATALYTIC DEPOLYMERISATION OF POLYMERIC MATERIALS

CROSS REFERENCE TO RELATED APPLICATIONS

This is a national stage application of PCT/CA2013/000041, filed on Jan. 17, 2013. This application claims the benefit and priority of this prior application and incorporates its disclosure by reference in its entirety.

FIELD

The present disclosure relates to catalyzed depolymerisation of polymeric materials.

BACKGROUND

Manufacturers of mechanical equipment, food packagers, and other users of wax and grease for lubricating, sealing, and other uses have a continuing need for wax and grease compositions. Manufacturing of these waxes and greases are usually expensive. This may be typically due to requirement of pricey petroleum feed in such manufacturing process.

Waxes and grease (or grease base-stocks), in general, are made from petroleum feed or gas-to-liquid processes. The price of petroleum feed stocks is increasing with time and thus there is a steady increase in prices of waxes and greases. Recently, there have been several discoveries of gas (mostly methane) reservoirs and using Fischer-Tropsch process, these can be converted into higher chain length hydrocarbons to give gasoline, lubricating oils, grease base stocks, and waxes. The products produced this way are relatively more expensive and thus there is a need to utilize readily available polyethylene waste and recycle them to produce the same materials at considerably lower cost.

It would be advantageous to have a relatively inexpensive process for producing wax and grease base stock. Such a process would ideally utilize a readily available inexpensive feedstock and would use an inexpensive process. Waste plastics/polymers have been used in known processes for the manufacture of such products. Plastic waste is among the fastest growing solid waste and utilizing this solid waste to produce useful wax and grease addresses growing plastic disposal problems.

In recent times, there have been considerable efforts to convert these polymeric solid wastes into useful products such as fuels, lubricants, waxes and grease base stocks. Existing conversion processes may not be efficient enough and can release green-house gases into the environment. Further, current techniques may be sensitive to quality and quantity of waste plastic feed and they can have an impact to the end product quality. This can be especially important as plastic waste can vary in its consistency due to the varying plastic grades.

SUMMARY

In one aspect, there is provided a process for converting a molten polymeric material. The process includes effecting disposition of a molten polymeric material, having at least one carbon-carbon double bond, in sufficient proximity to a catalyst material within a reaction zone, to effect a reactive process that effects generation of a reaction product. The reactive process effects cleaving of at least one carbon-carbon double bond. The catalyst material includes [Fe—Cu—Mo—P]/$Al_2O_3$ prepared by binding a ferrous-copper complex to an alumina support to generate an intermediate material, and reacting the intermediate material with a heteropolyacid.

In another aspect, there is provided a process for converting polymeric material to make waxes and grease base stock through catalytic depolymerisation, comprising: preheating the polymeric material to form a molten polymeric material; starting depolymerisation reaction of the molten polymeric material using a catalyst material in a high pressure reactor at a desired temperature in the range of 300° C. to 600° C. using heaters in the high pressure reactor; allowing progression of the depolymerisation reaction of the molten polymeric material to continue until a pressure in the high pressure reactor reaches a predetermined value in the range of 50 psig to 350 psig; and turning off the heaters and stopping the depolymerisation reaction of the molten polymeric material upon the pressure in the reactor reaching the desired value and wherein the polymeric material is converted to wax or a grease base stock; wherein the catalyst material is [Fe—Cu—Mo—P]/$Al_2O_3$ prepared by binding a ferrous-copper complex to an alumina support and reacting it with a heteropolyacid.

In another aspect, there is provided a process for converting primary granules of polymeric material to make waxes and grease base stock through catalytic depolymerisation, comprising: preheating the primary granules of polymeric material to form a molten primary granules of polymeric material; starting depolymerisation reaction of the molten primary granules of polymeric material using a catalyst material in a high pressure reactor at a desired temperature in the range of 300° C. to 600° C. using heaters in the high pressure reactor; allowing progression of the depolymerisation reaction of the molten primary granules of polymeric material to continue until a pressure in the high pressure reactor reaches a predetermined value in the range of 50 psig to 350 psig; and turning off the heaters and stopping the depolymerisation reaction of the molten primary granules of polymeric material upon the pressure in the reactor reaching the desired value and wherein the primary granules of polymeric material is converted to wax or grease base stock; wherein the catalyst material is [Fe—Cu—Mo—P]/$Al_2O_3$ prepared by binding a ferrous-copper complex to an alumina support and reacting it with a heteropolyacid.

BRIEF DESCRIPTION OF THE DRAWINGS

Various embodiments are described herein with reference to the drawings, wherein:

FIG. 10 is a table illustrating process conditions for the production of wax obtained from reacting polypropylene in accordance with an embodiment of the present process.

Figure 1:
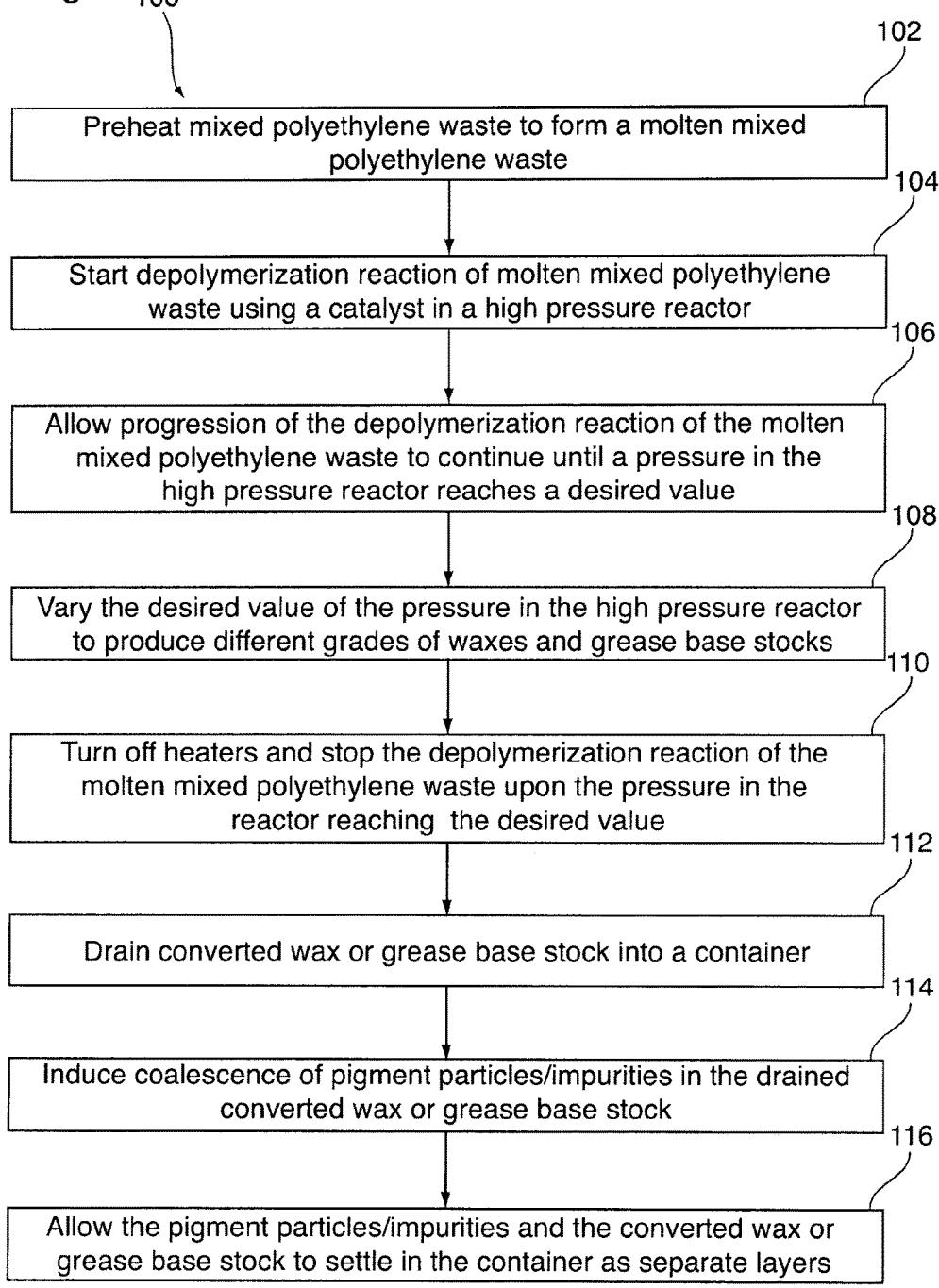
FIG. 1 shows a flow diagram of an exemplary process for converting mixed polyethylene waste to produce waxes and grease base stocks through catalytic depolymerisation, according to one embodiment.

The drawings described herein are for illustration purposes only and are not intended to limit the scope of the present disclosure in any way.

DETAILED DESCRIPTION

A method of contacting a polymeric material (such as, for example, waste polymeric material), having at least one carbon-carbon double bond, with a catalyst, to effect a generation of a reaction product is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

More specifically, there is provided a process of effecting disposition of a molten polymeric material, having at least one carbon-carbon double bond, in sufficient proximity to a catalyst material within a reaction zone, to effect a reactive process that effects generation of a reaction product, wherein the reactive process effects cleaving of at least one carbon-carbon double bond. The catalyst material includes [Fe—Cu—Mo—P]/$Al_2O_3$. The catalyst material is prepared in accordance with a process, the process includes binding a ferrous-copper complex to an alumina support to generate an intermediate material, and reacting the intermediate material with a heteropolyacid.

Suitable examples of polymeric material include polyethylene, polypropylene, polyethylene terephthalate, ethylene-vinyl acetate, polyphenylene ether, polyvinyl chloride, polystyrene, lignin, nylon, or cellulose. In some embodiments, for example, the polymeric material includes any one of, or any combination of, polyethylene, polypropylene, polyethylene terephthalate, ethylene-vinyl acetate, polyphenylene ether, polyvinyl chloride, polystyrene, lignin, nylon, or cellulose.

In some embodiments, for example, and as mentioned above, the polymeric material includes waste polymeric material. Suitable waste polymeric material includes mixed polyethylene waste, mixed polypropylene waste, and a mixture including mixed polyethylene waste and mixed polypropylene waste. The mixed polyethylene waste can include low density polyethylene (LDPE), linear low density polyethylene (LLDPE), high density polyethylene (HDPE), polypropylene (PP), or a mixture including any combination of LDPE, LLDPE, HDPE, and PP. In some embodiments, for example, the mixed polyethylene waste includes grocery bags, milk pouches, stationery files. In some embodiments, for example, the waste polymeric material feed includes up to 10 weight % of material that is other than polymeric material, based on the total weight of the waste polymeric material.

In some embodiments, for example, the polymeric material includes primary granules of a polymeric resin.

In some embodiments, for example, the process is effected within a reaction vessel. Depending on the nature of the polymeric material, the wall temperature of the vessel should, preferably, not exceed a maximum temperature. If the wall temperature is excessive, thermal degradation of the resin will be effected on the internal wall surface of the vessel, and the reaction may proceed in an uncontrollable fashion. As well, the process may, generally, be unable to effect the desired selectivity, and also be unable to achieve desirable yields of the desired product material, such that excessive greases, oils and gases are present in the product material.

In some embodiments, for example, if the polymeric material includes polymers with functional groups containing aromatics, halogens, nitrogen, oxygen, or sulphur, the vessel and all process piping are fabricated from either 316 stainless steel or Hastelloy™, or are glass-lined to avoid degradation of the steel by acidic or highly reactive side products.

In some embodiments, for example, appropriate venting procedures and containment units are provided for removal of any aromatics, volatile organic compounds, or acidic vapour (e.g. HCl) that is present in the headspace of the reaction vessel during depolymerisation. Further processing through distillation, solvent washes, or use of various absorbent materials will allow for removal of remaining trace acidic, coloured, or aromatic compounds in the wax.

In those embodiments where the polymeric material is difficult to melt or isolate in a free flowing liquid form (e.g. lignin), in some of these embodiments, for example, an appropriate solvent or ionic liquid is employed to dissolve the provided polymeric material prior to having decomposition effected in the presence of the catalyst material.

In some embodiments, for example, the reactive process is effected in a reaction zone of the reaction vessel. In some of these embodiments, for example, the pressure within the reaction zone is within the range of 10 to 10,000 psig, the temperature within the reaction zone is within the range of 250 to 500 degrees Celsius, the vessel wall temperature is within the range of 300 to 700 degrees Celsius, the amount of catalyst material present within the reaction zone is within the range of 0.5 to 10 weight %, based on the total weight of the mixture of the polymeric material and the catalyst material, the volume of the mixture of the polymeric material and the catalyst material defines 70% of the total available space within the reaction vessel, and the headspace within the reaction vessel includes air or nitrogen, or may be defined by a vacuum, or substantially a vacuum.

For polyethylene, polyethylene waste, or mixed polyethylene waste, the temperature within the reaction zone is within the range of 300 to 600 degrees Celsius, and the pressure within the reaction zone is within the range of 50 psig to 350 psig.

In some embodiments, for example, the process effects depolymerisation of at least a fraction of the polymeric material. The process requires much lower energy than other known depolymerisation processes, and allows for selective production of synthetic waxes, greases, oil or solvents, with yields of, potentially, greater than 90%. When a synthetic wax is targeted with a yield of 90 to 99%, this is achieved with a one (1) to nine (9) % hydrocarbon oil product.

In some embodiments, for example, wax generated through this process has melting points in the range of 75 to 170 degrees Celsius. Variation in the melting points is achieved by varying pressure within the reaction zone, temperature within the reaction zone, and the source resin.

In some embodiments, for example, the process further includes, while the molten polymeric material is disposed in sufficient proximity to the catalyst material within a reaction zone to effect a reactive process that effects generation of a reaction product, wherein the reactive process effects cleaving of at least one carbon-carbon double bond, heating the reaction zone such that the reaction zone is disposed at a temperature that is effective for the effecting of the reactive process, and suspending the heating when the pressure within the reaction zone becomes disposed at a predetermined pressure. The predetermined pressure is correlated with the existence of a desirable reaction product. As the reactive process is effected, pressure increases. This is because the reactive process effects production of lower molecular weight materials, which typically have lower vapour pressure, and which, therefore, have a greater tendency to be disposed in the gaseous phase. The disposition of the reaction zone at the predetermined pressure is an indication that the reactive process has proceeded such that generation of a desirable reaction product has been effected. The predetermined pressure is based on the reaction product whose generation is desired to be effected from the reactive process, and may vary, depending on the desired reaction product. In some embodiments, for example, the predetermined pressure can be varied to effect generation of different grades of waxes and grease base stocks. For polyethylene, polyethylene waste, or mixed polyethylene waste, the predetermined pressure is within the range of 50 psig to 350 psig. For polypropylene, the predetermined pressure is within the range of 50 psig to 1000 psig.

In some embodiments, for example, the polymeric material is pre-heated within an extruder so as to effect generation of the molten polymeric material, and the molten polymeric material is then supplied to the reaction vessel by motive forces applied by the extruder to the polymeric material. In some embodiments, for example, the extruder effects substantially continuous pushing of the molten polymeric material into the reaction vessel.

In some embodiments, for example, the reaction product collects at the bottom of the reaction vessel. In this respect, in some of these embodiments, for example, the reaction product is drained from the reaction vessel (such as, for example, into a container).

In some embodiments, for example, the process further includes, after the draining of the reaction product into a container, inducing coalescence of pigments, particles, and other impurities, within the drained reaction product, using a high to low pressure cycle, and allowing the pigment, particles and other impurities to settle out from the reaction product such that separate phases are generated.

The following is a discussion of exemplary embodiments of the process, including practising of the process with specific examples of polymeric material.

(a) Mixed Polyethylene Waste

FIG. 1 shows a flow diagram 100 of an exemplary process for producing waxes and grease base stocks through catalytic depolymerisation of mixed polyethylene waste, according to one embodiment. Waxes are slippery solid materials that are easy to melt. Generally, the melting point of waxes ranges between 45° C. to 130° C. and flash point (i.e. lowest temperature at which the wax can vaporize to form an ignitable mixture in air) ranges between 180° C. to 350° C. The waxes may be mostly derived by refining crude petroleum. The waxes may be also derived from natural secretions of plants and animals. Further, the waxes may be synthetically produced using processes such as Ficher-Tropsch.

The grease or grease base stock is a semi-solid substance introduced between two moving surfaces to reduce the friction between them, improving efficiency and reducing wear. Commercially available greases are generally made by mixing grease base stocks with small amounts of specific additives to give them desired physical properties. Generally, greases are of four types: (a) admixture of mineral oils and solid lubricants (b) blends of residuum, waxes, uncombined fats, rosin oils and pitches, (c) soap thickened mineral oils and (d) synthetic greases like poly-alpha olefins, silicones, etc.

The mixed polyethylene waste may include LPDE, LLPDE, or HPDE, or any combination thereof. For example, the polyethylene waste may be available as shopping bags, grocery bags as sacks of HDPE, milk pouches of LDPE and stationery files of LLDPE. In one embodiment, primary granules of polyethylene may be also used for producing the waxes and grease base stocks. Further, the mixed polyethylene waste may include impurities (e.g., such as polypropylene and polystyrene) up to about 10%.

At step 102, the mixed polyethylene waste is preheated to form a molten mixed polyethylene waste. For example, the mixed polyethylene waste is preheated in an extruder attached to a high pressure reactor (e.g., the reactor 804 of FIG. 8). The molten mixed polyethylene waste formed in the extruder is substantially continuously pushed into the high pressure reactor. At step 104, depolymerisation reaction of the molten mixed polyethylene waste is started using a catalyst in the high pressure reactor at a desired temperature using heaters in the high pressure reactor. The catalyst used is [Fe—Cu—Mo—P]/$Al_2O_3$ which is disposed on a stirring blade of the high pressure reactor. The catalyst is prepared by binding a ferrous-copper complex to an alumina support and reacting it with heteropolyacid to obtain the final catalyst. The temperature in the high pressure reactor is in the range of about 300° C. to 600° C.

At step 106, progression of the depolymerisation reaction of the molten mixed polyethylene waste is allowed to continue until a pressure in the high pressure reactor reaches a desired value. The pressure in the high pressure reactor is in the range of about 50 psig-350 psig. At step 108, the desired value of the pressure in the high pressure reactor is varied to produce different grades of waxes and grease base stocks. For example, the different grades of waxes include waxes having different melting points ranging from 60° C. to 100° C.

At step 110, the heaters are turned off and the depolymerisation reaction of the molten mixed polyethylene waste is stopped upon the pressure in the reactor reaching the desired value. During the depolymerisation reaction, the molten mixed polyethylene waste is converted to wax or grease base stock. At step 112, the converted wax or the grease base stock is drained into a container when the converted wax or the grease base stock is liquid and is substantially above flash point.

It can be noted that, during the depolymerisation reaction, there is no gas liberated and thus, there is a complete carbon recovery in the form of waxes or grease base stocks. At step 114, coalescence of pigment particles/impurities in the drained converted wax or the grease base stock is started using a high to low pressure cycle. At step 116, the pigment particles/impurities and the converted wax or grease base stock are allowed to settle in the container as separate layers.

Figure 2:
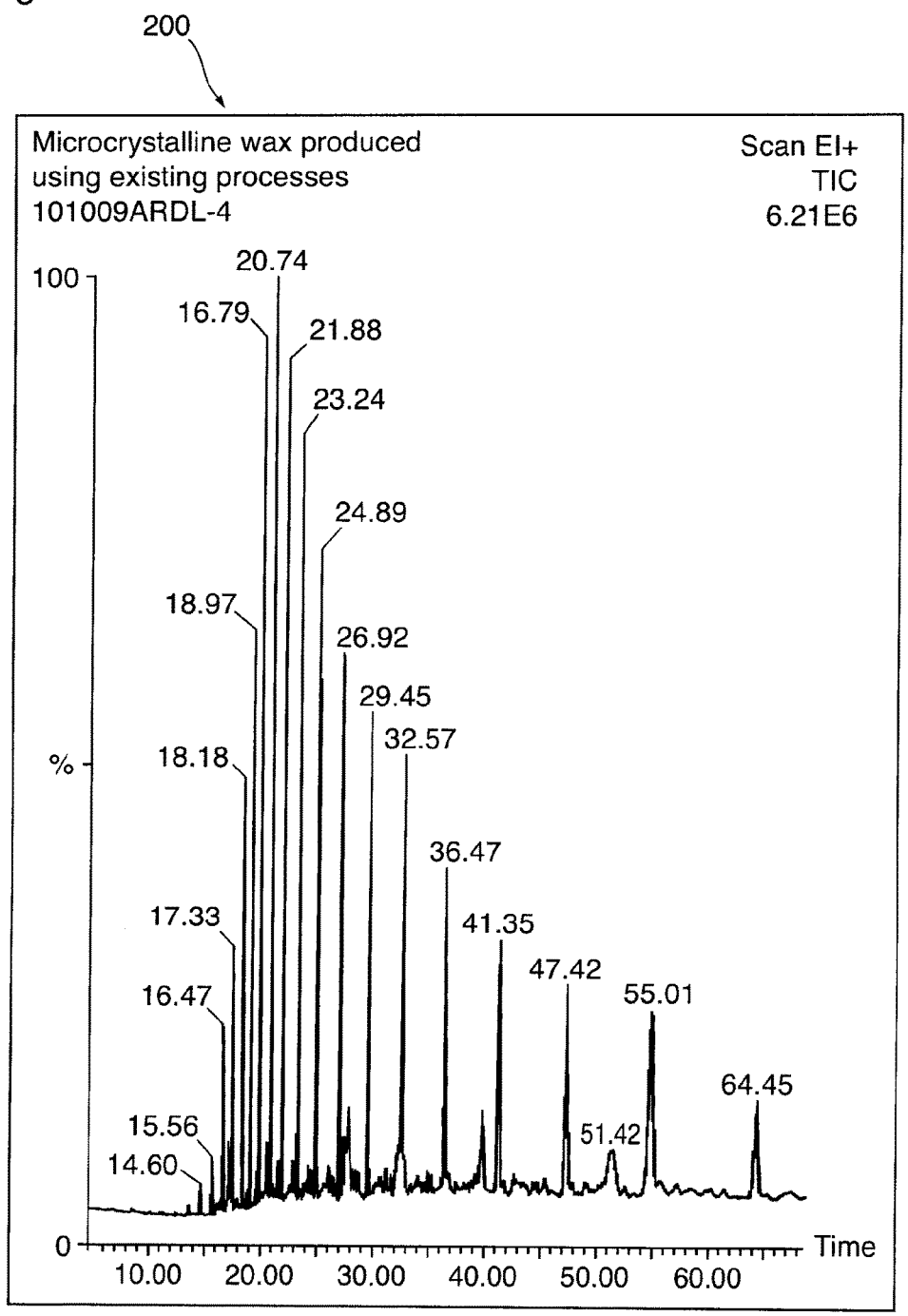
FIG. 2 shows an exemplary graph of gas chromatography-mass spectrometry (GC-MS) results of microcrystalline wax produced using existing processes.

FIG. 2 shows, in the context of the invention, an exemplary graph 200 of gas chromatography-mass spectrometry (GC-MS) results of microcrystalline wax produced using existing processes. For example, GC-MS is a method that combines features of gas-liquid chromatography and mass spectrometry to identify different components in the microcrystalline wax produced using existing processes. (The microcrystalline waxes are type of waxes that have melting points ranging from 60° C. to 100° C. and are generally harder than paraffin waxes). The x-axis of the graph 200 represents retention time and y-axis represents intensity.

Figure 3:
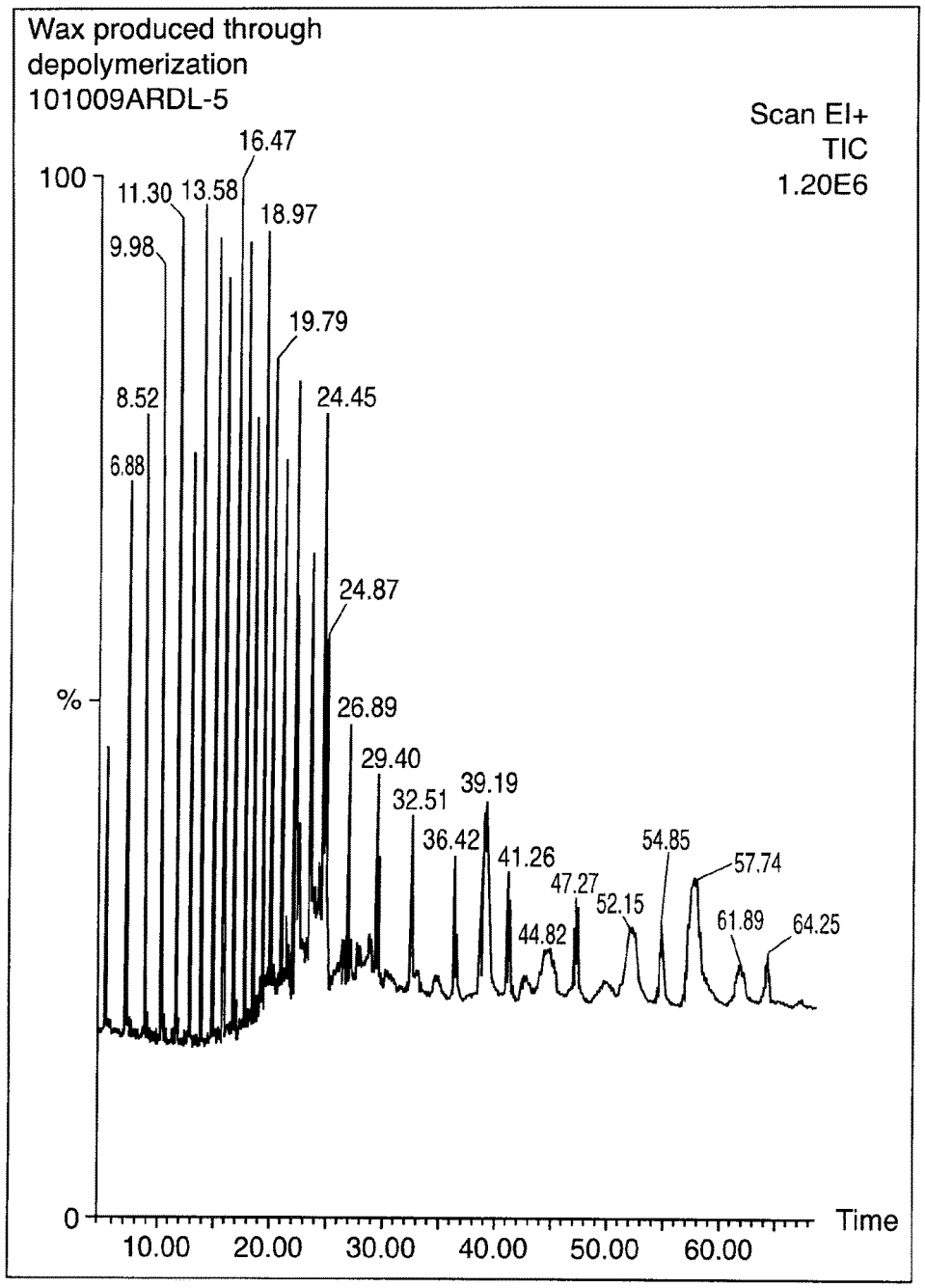
FIG. 3 shows an exemplary graph of GC-MS results of wax obtained from depolymerisation of high density polyethylene (HDPE) waste, according to one embodiment.

FIG. 3 shows an exemplary graph 300 of GC-MS results of wax obtained from depolymerisation of high density polyethylene (HDPE) waste, according to one embodiment. The depolymerisation reaction of the HDPE waste is performed according to the process explained in FIG. 1. About 3.5 kg of the HDPE waste purchased from local market is taken for the depolymerisation reaction in the high pressure reactor (which has a capacity of 6.5 liters). Different experiments are carried out to compare properties of the wax obtained from the depolymerisation reaction with that of the microcrystalline wax produced using the existing processes.

In Experiment 1, a desired pressure of 140 pound-force per square inch gauge (psig) is chosen. When the pressure inside the high pressure reactor reaches 140 psig, the depolymerisation reaction is stopped. The wax obtained is drained, cooled, and tested for GC-MS. TABLE 1 shows properties of the wax obtained through the depolymerisation reaction compared against commercially available ARGE wax (a type of Fischer-Tropsch wax).

TABLE 1

| Sl. No. | Properties | Commercial ARGE wax | Wax obtained by catalytic depolymerization of HDPE waste |
|---|---|---|---|
| 1 | Melting Point (° C.) | 105 | 97 |
| 2 | Average Number of Carbons | 47 | 48 |
| 3 | Nuclear magnetic resonance (NMR) | Identical | Identical |
| 4 | Solubility in Acetone (weight %) | 28 | 17.5 |
| 5 | Solubility in Cyclohexane (wt %) | 69 | 75 |
| 6 | IR | Identical | Identical |
| 7 | Acid value | 0 | 0 |
| 8 | Saponification No. | 0 | 0 |

The graph 200 and the graph 300 are compared. The comparison of molecular weight distribution (MWD) is shown in TABLE 2.

TABLE 2

| Sl. No. | Properties | Test method | Microcrystalline wax produced using existing processes | Wax obtained by catalytic depolymerization of HDPE waste |
|---|---|---|---|---|
| 1 | Melting point (° C.) | Differential scanning calorimetry (DSC) | 67.84 | 72.42 |
| 2 | Structural information | GC-MS | $C_{20}$-$C_{39}$ | $C_{14}$-$C_{41}$ |

It can be inferred from TABLE 2 and the graphs 200 and 300 that, the wax obtained from the depolymerisation of the HDPE waste has broader MWD and slightly higher melting point but is otherwise comparable to the microcrystalline wax produced using the existing processes.

Figure 4:
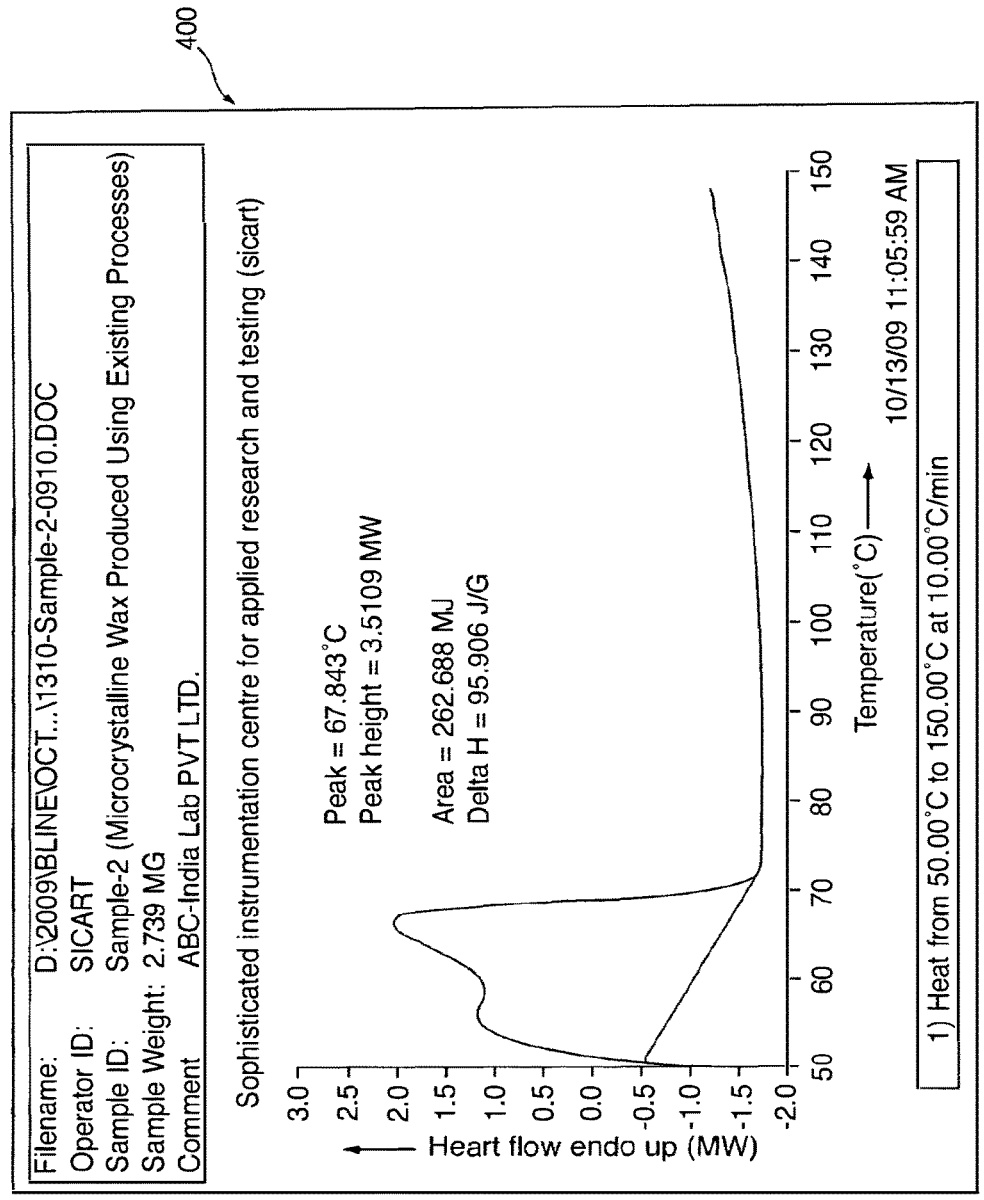
FIG. 4 shows a graph of differential scanning calorimetric (DSC) analysis of the microcrystalline wax produced using existing processes.

FIG. 4 shows, in the context of the invention, a graph 400 of differential scanning calorimetric (DSC) analysis of the microcrystalline wax produced using existing processes. DSC is a thermoanalytical technique in which difference in amount of heat required to increase temperature of a sample and reference is measured as a function of temperature. The x-axis of the graph 400 represents temperature and the y-axis represents heat flow.

Figure 5:
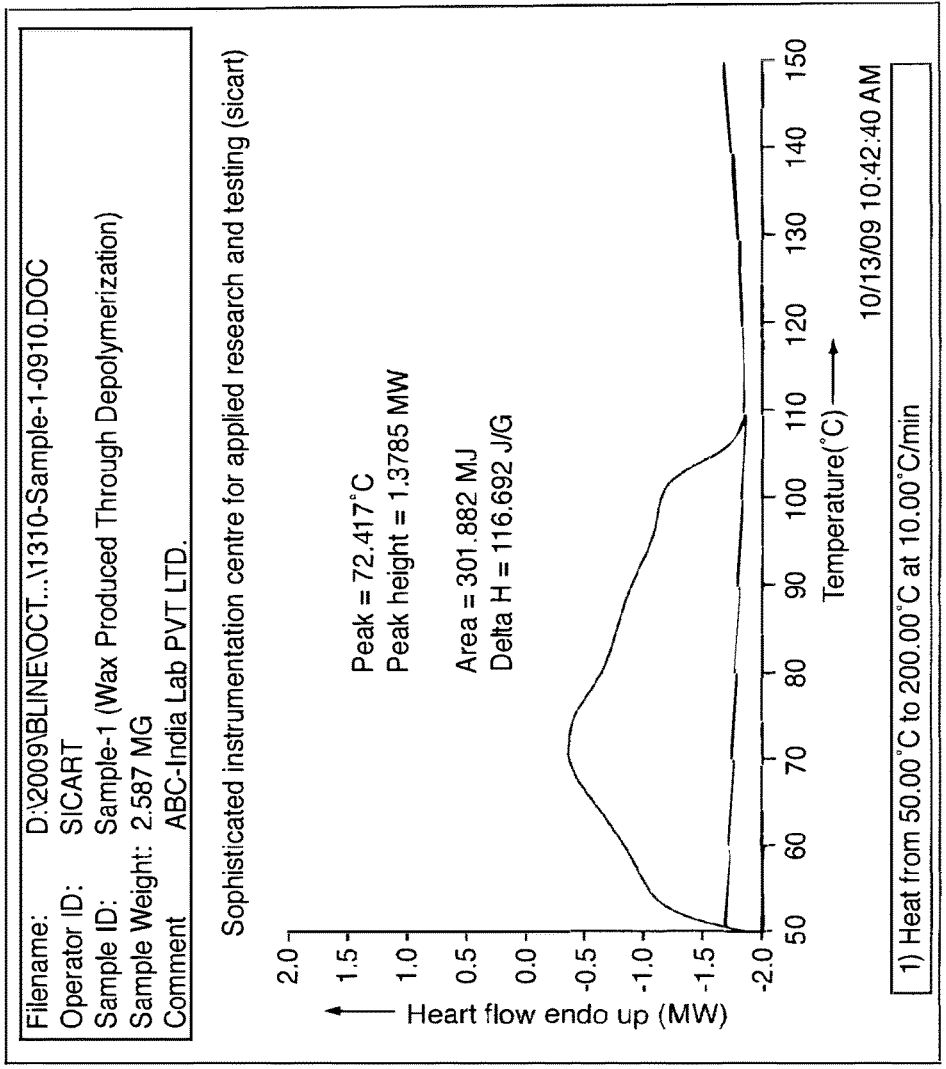
FIG. 5 shows a graph of DSC analysis of the wax obtained from the depolymerisation of the HPDE waste, according to one embodiment.

FIG. 5 shows a graph 500 of DSC analysis of the wax obtained from the depolymerisation of HPDE waste, according to one embodiment. The graph 400 and the graph 500 are compared. The melting point of the wax obtained from the depolymerisation of the HDPE is about 10% higher than that of the microcrystalline wax produced using the existing processes. Further, the wax produced from the HDPE is found to have a natural tack which makes it highly suitable for wax polishes and shoe polishes.

Experiment 2 considers the melting point of wax which is an important property. The melting point of wax is determined by the desired value of pressure inside the high pressure reactor. TABLE 3 below shows different values of pressure which yields waxes of different melting points.

TABLE 3

| Sl. No. | Pressure (psig) | Melting point of product wax (° C.) |
|---|---|---|
| 1 | 50 | 100 |
| 2 | 80 | 90 |
| 3 | 110 | 80 |
| 4 | 140 | 75 |
| 5 | 200 | 60 |

In Experiment 3, the following composition of feed is considered in the high pressure reactor. It should be noted that the HDPE, LDPE, and LLDPE are available as primary granules.
1. Primary granules of HDPE, LDPE and LLDPE as pure feed
2. Waste materials of HDPE, LDPE and LLDPE as pure feed
3. Various mixtures of primary granules of HDPE, LDPE and LLDPE
4. Various mixtures of waste materials of HDPE, LDPE and LLDPE
5. Mixture of (1) and (2)
6. Waste materials of HDPE, LDPE and LLDPE as pure feeds with 10% of impurities of polystyrene and polypropylene.

In each of the cases, the desired value of pressure inside the high pressure reactor remained unchanged indicating that the catalyst is specific to breaking of $CH_2$—$CH_2$ bonds and is relatively insensitive to the nature of feed.

In Experiment 4, water emulsion of various waxes produced in Experiment 2 is prepared and below composition is followed:

Composition A—Wax 5 g and Stearic acid 2.5 g

Composition B—Water 300 g, Morpholine 3 g and Stearic acid 2.5 g

Solids in composition A are mixed and melted. This is mixed with already heated composition B. The emulsion is obtained on stirring. It can be seen that, the emulsion is stable and the wax does not separate from the water layer. The emulsion thus formed forms a very thin layer of wax on coating having strength depending upon the melting point of the wax used.

In Experiment 5, grease base stock is produced for cut-off pressure of 250-300 psig (which is Sample 1) and cut-off pressure of 300-350 psig (Sample 2). In one embodiment, viscosities of the sample 1 and the sample 2 are determined as a function of temperature and shear rate.

Figure 6:
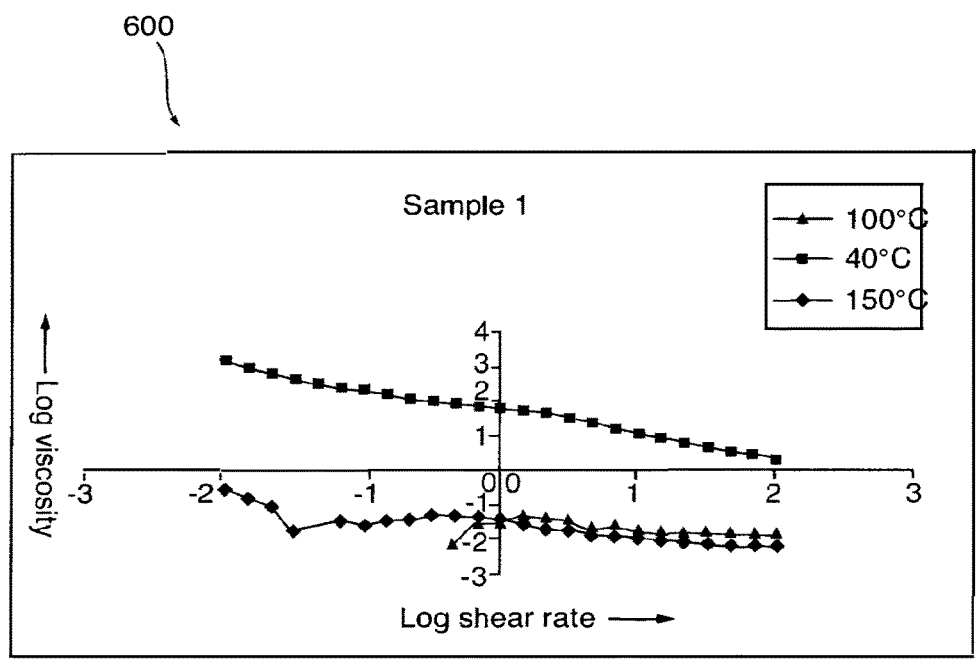
FIG. 6 shows a graph of log shear versus log viscosity of sample 1 of the grease base stock, according to one embodiment.

FIG. 6 shows a graph 600 of log shear versus log viscosity of sample 1 of the grease base stock, according to one embodiment. The log shear is represented on x-axis and log viscosity is represented on y-axis of the graph 600. The shear rate, shear stress and viscosity of sample 1 at 40° C., 100° C. and 150° C. are given in TABLES 4, 5 and 6.

TABLE 4

(at 40° C.)

| Shear Rate [1/s] | Shear Stress [Pa] | Viscosity [Pa · s] |
|---|---|---|
| 0.01 | 18.9 | 1,890 |
| 0.0147 | 16.8 | 1,150 |
| 0.0215 | 16.9 | 786 |
| 0.0316 | 17.9 | 566 |
| 0.0464 | 19 | 410 |
| 0.0681 | 20.5 | 301 |
| 0.1 | 22.7 | 227 |
| 0.147 | 25.7 | 175 |
| 0.215 | 29.6 | 137 |
| 0.316 | 34.6 | 110 |
| 0.464 | 41.8 | 90 |
| 0.681 | 52.9 | 77.7 |
| 1 | 70.8 | 70.8 |
| 1.47 | 92.3 | 62.9 |
| 2.15 | 106 | 49.2 |
| 3.16 | 112 | 35.5 |
| 4.64 | 117 | 25.2 |
| 6.81 | 122 | 17.9 |
| 10 | 128 | 12.8 |
| 14.7 | 135 | 9.22 |
| 21.5 | 145 | 6.72 |
| 31.6 | 156 | 4.94 |
| 46.4 | 172 | 3.71 |
| 68.1 | 193 | 2.83 |
| 100 | 219 | 2.19 |

TABLE 5

(100° C.)

| Shear Rate [1/s] | Shear Stress [Pa] | Viscosity [Pa · s] |
|---|---|---|
| 0.464 | 0.00276 | 0.00594 |
| 0.681 | 0.019 | 0.0278 |
| 1 | 0.0285 | 0.0285 |
| 1.47 | 0.0669 | 0.0456 |
| 2.15 | 0.0835 | 0.0388 |
| 3.16 | 0.0983 | 0.0311 |
| 4.64 | 0.0751 | 0.0162 |
| 6.81 | 0.148 | 0.0217 |
| 10 | 0.157 | 0.0157 |
| 14.7 | 0.238 | 0.0162 |

TABLE 5-continued (100° C.)

| Shear Rate [1/s] | Shear Stress [Pa] | Viscosity [Pa · s] |
|---|---|---|
| 21.5 | 0.312 | 0.0145 |
| 31.6 | 0.441 | 0.0139 |
| 46.4 | 0.613 | 0.0132 |
| 68.1 | 0.85 | 0.0125 |
| 100 | 1.2 | 0.012 |

TABLE 6

(150° C.)

| Shear Rate [1/s] | Shear Stress [Pa] | Viscosity [Pa · s] |
|---|---|---|
| 0.01 | 0.00319 | 0.319 |
| 0.0147 | 0.00233 | 0.159 |
| 0.0215 | 0.00202 | 0.0939 |
| 0.0316 | 0.00055 | 0.0175 |
| 0.0464 | 0.000423 | 0.00912 |
| 0.0681 | 0.00258 | 0.0379 |
| 0.1 | 0.00265 | 0.0265 |
| 0.147 | 0.00532 | 0.0363 |
| 0.215 | 0.00772 | 0.0358 |
| 0.316 | 0.0155 | 0.0491 |
| 0.464 | 0.0215 | 0.0464 |
| 0.681 | 0.0295 | 0.0432 |
| 1 | 0.0374 | 0.0374 |
| 1.47 | 0.0418 | 0.0285 |
| 2.15 | 0.0407 | 0.0189 |
| 3.16 | 0.0574 | 0.0181 |
| 4.64 | 0.0637 | 0.0137 |
| 6.81 | 0.0835 | 0.0123 |
| 10 | 0.104 | 0.0104 |
| 14.7 | 0.136 | 0.00924 |
| 21.5 | 0.167 | 0.00777 |
| 31.6 | 0.214 | 0.00677 |
| 46.4 | 0.285 | 0.00614 |
| 68.1 | 0.426 | 0.00625 |
| 100 | 0.583 | 0.00583 |

Figure 7:
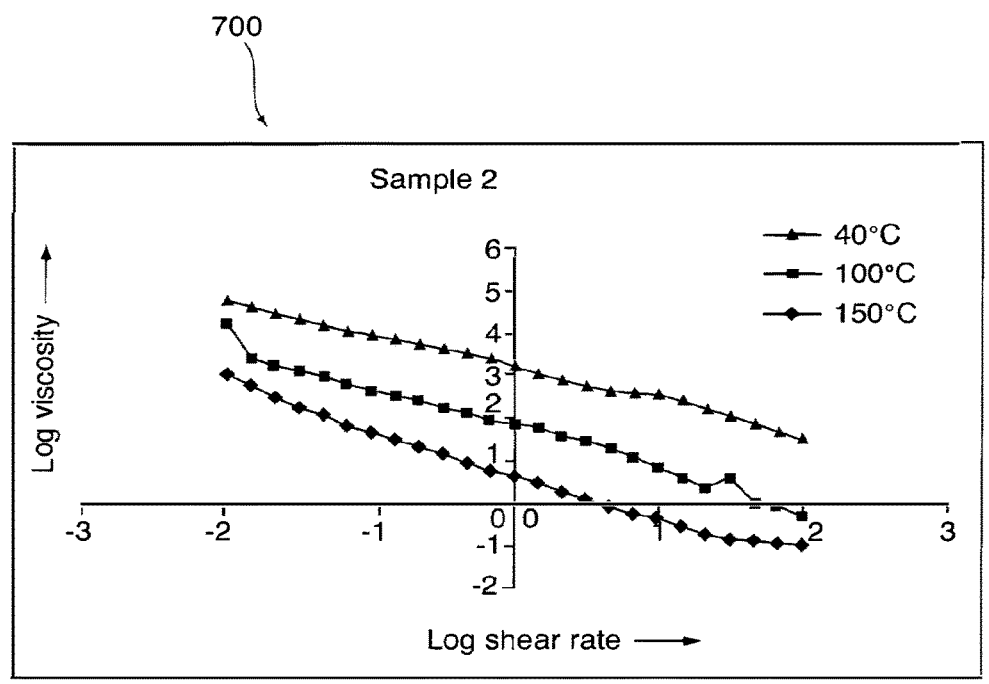
FIG. 7 shows a graph of log shear versus log viscosity of sample 2 of the grease base stock, according to one embodiment.

FIG. 7 shows a graph 700 of log shear versus log viscosity of sample 2 of the grease base stock, according to one embodiment. The log shear is represented on x-axis and log viscosity is represented on y-axis of the graph 700. The shear rate, shear stress and viscosity of sample 1 at 40° C., 100° C. and 150° C. are given in TABLES 6, 7 and 8.

TABLE 6

(at 40° C.)

| Shear Rate [1/s] | Shear Stress [Pa] | Viscosity [Pa · s] |
|---|---|---|
| 0.00998 | 617 | 61,800 |
| 0.0147 | 632 | 43,000 |
| 0.0215 | 657 | 30,500 |
| 0.0316 | 693 | 21,900 |
| 0.0464 | 736 | 15,900 |
| 0.0681 | 798 | 11,700 |
| 0.1 | 879 | 8,790 |
| 0.147 | 987 | 6,720 |
| 0.215 | 1,130 | 5,240 |
| 0.316 | 1,300 | 4,120 |
| 0.464 | 1,470 | 3,170 |
| 0.681 | 1,520 | 2,230 |
| 1 | 1,520 | 1,510 |
| 1.47 | 1,470 | 1,000 |
| 2.15 | 1,530 | 709 |
| 3.16 | 1,720 | 544 |
| 4.64 | 1,820 | 393 |
| 6.81 | 2,280 | 335 |
| 10 | 3,170 | 316 |
| 14.7 | 3,290 | 224 |

TABLE 6-continued (at 40° C.)

| Shear Rate[1/s] | Shear Stress[Pa] | Viscosity [Pa · s] |
|---|---|---|
| 21.6 | 3,070 | 142 |
| 31.6 | 3,100 | 97.9 |
| 46.4 | 2,880 | 62.1 |
| 68.1 | 2,840 | 41.7 |
| 100 | 2,760 | 27.6 |

TABLE 7

(at 100° C.)

| Shear Rate[1/s] | Shear Stress[Pa] | Viscosity [Pa · s] |
|---|---|---|
| 0.00999 | 175 | 17,500 |
| 0.0147 | 38.5 | 2,630 |
| 0.0215 | 39 | 1,810 |
| 0.0316 | 40.1 | 1,270 |
| 0.0464 | 44.1 | 950 |
| 0.0681 | 43.9 | 644 |
| 0.1 | 45.8 | 458 |
| 0.147 | 48.1 | 328 |
| 0.215 | 51.3 | 238 |
| 0.316 | 53.8 | 170 |
| 0.464 | 55.4 | 119 |
| 0.681 | 60.9 | 89.4 |
| 1 | 69.5 | 69.5 |
| 1.47 | 76.8 | 52.3 |
| 2.15 | 83.5 | 38.8 |
| 3.16 | 84.6 | 26.8 |
| 4.64 | 82.8 | 17.8 |
| 6.81 | 74.8 | 11 |
| 10 | 59.2 | 5.92 |
| 14.7 | 53.9 | 3.67 |
| 21.5 | 45.7 | 2.12 |
| 31.5 | 110 | 3.49 |
| 46.4 | 40.2 | 0.867 |
| 68.1 | 50.7 | 0.744 |
| 100 | 45.8 | 0.458 |

TABLE 8

(at 150° C.)

| Shear Rate[1/s] | Shear Stress[Pa] | Viscosity [Pa · s] |
|---|---|---|
| 0.01 | 11.6 | 1,160 |
| 0.0147 | 9.23 | 628 |
| 0.0316 | 5.77 | 183 |
| 0.0464 | 5.59 | 120 |
| 0.0681 | 4.54 | 66.7 |
| 0.1 | 4.48 | 44.8 |
| 0.147 | 4.46 | 30.4 |
| 0.215 | 4.46 | 20.7 |
| 0.316 | 4.61 | 14.6 |
| 0.464 | 3.86 | 8.32 |
| 0.681 | 3.9 | 5.72 |
| 1 | 3.97 | 3.97 |
| 1.47 | 4.08 | 2.78 |
| 2.15 | 3.63 | 1.69 |
| 3.16 | 3.72 | 1.18 |
| 4.64 | 3.6 | 0.776 |
| 6.81 | 3.55 | 0.521 |
| 10 | 3.92 | 0.392 |
| 14.7 | 4.04 | 0.275 |
| 21.5 | 3.72 | 0.173 |
| 31.6 | 4.41 | 0.14 |
| 46.4 | 5.82 | 0.125 |
| 68.1 | 7.26 | 0.107 |
| 100 | 10 | 0.1 |

The above-mentioned experiments suggest that smaller cut-off pressure yields grease base stocks with higher viscosity. As the temperature of the grease base stock is increased, value of the viscosity is decreased as expected. For a given temperature and cut-off pressure, the viscosity is dependent upon the shear rate and falls drastically. Up to 100 per second shear rate, the viscosity falls by a factor of 1000, leading to an increase in lubrication by the same factor. This indicates that the grease base stock has a natural ability to give a high degree of lubrication.

Figure 8:
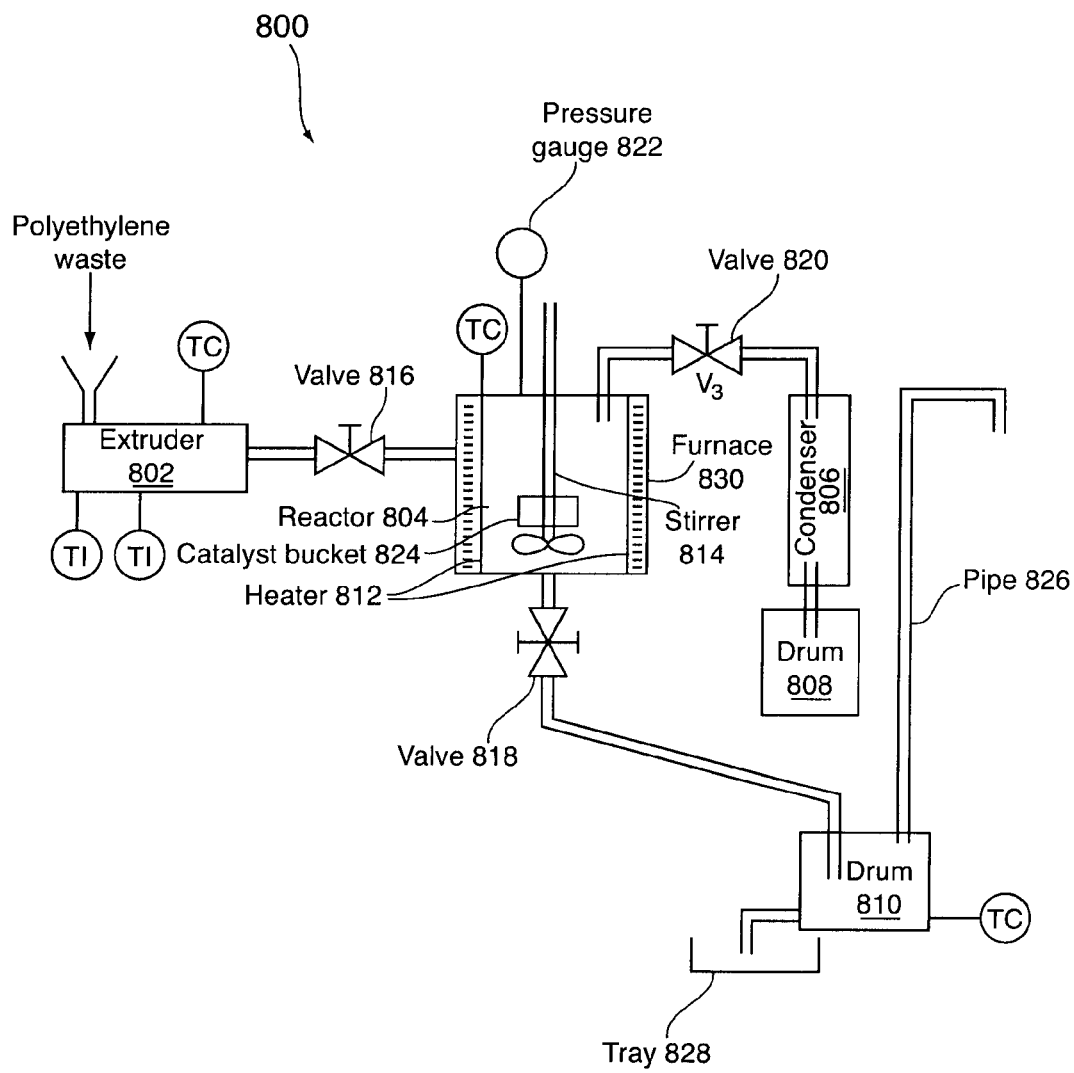
FIG. 8 shows a block diagram of a device for converting the mixed polyethylene waste to make waxes and grease base stocks, according to one embodiment.

FIG. 8 shows a block diagram 800 of a device for producing waxes and grease base stocks through catalytic depolymerisation of waste plastics, according to one embodiment. Particularly, the device includes an extruder 802, a furnace 830, a reactor 804, a condenser 806, a drum 808, a drum 810, and a tray 828.

The extruder 802 is a four inch barrel which is twenty four inches long. The extruder 802 preheats the polyethylene waste and pushes molten polyethylene waste to the reactor 804. The extruder 802 operates at 300° C. and pushes the molten polyethylene waste through a valve 816. In one embodiment, preheating the polyethylene waste may make possible lower processing time of the polyethylene waste in the reactor 804 since the preheating takes place outside the reactor 804 (in the extruder 802). Further, a semi-continuous process is ensured in the reactor 804.

The reactor 804 is 2 cm thick, 15 cm in diameter and 30 cm in length and has a working capacity of 6.5 liters. As shown, the furnace 830 includes heaters 812 to heat the reactor 804. The temperature in the reactor 804 is maintained at 450° C. The reactor 804 includes a stirrer 814, a pressure gauge 822, and a catalyst bucket 824. The reactor 804 is designed in such a way that walls of the reactor 804 withstands high temperature and pressures during the depolymerisation process. The catalytic bucket 824 carries a catalyst which accelerates the depolymerisation reaction of the molten polyethylene waste in the reactor 804. In one example embodiment, the catalyst used is [Fe—Cu—Mo—P]/$Al_2O_3$.

In operation, when the reactor 804 receives the molten polyethylene waste, the temperature falls from 450° C. When the temperature falls, temperature of the heaters 812 is increased to ensure that pressure inside the reactor 804 is maintained at one atmospheric pressure by closing a valve 818 and opening a valve 820. The pressure inside the reactor 804 is measured using the pressure gauge 822. In one embodiment, the pressure inside the reactor 804 affects quality of wax formed. It can be noted that, volume of the molten polyethylene waste which is fed into the reactor 804 is doubled at the temperature inside the reactor 804.

The valve 816 and the valve 820 are closed to increase the pressure in the reactor 804. When a desired pressure (in the range of 50 psig-350 psig) is reached inside the reactor 804, the heaters 812 are turned off and the depolymerisation reaction is stopped. The depolymerisation reaction takes about one hour in the reactor 804. The valve 820 is gradually opened and the pressure inside the reactor 804 is allowed to fall to one atmospheric pressure. Vapor from the reactor 804 escapes through the valve 820 to the condenser 806 and is finally collected in the drum 808. The temperature inside the reactor 804 remains unchanged.

As the pressure in the reactor 804 falls to one atmospheric pressure, the valve 820 is closed and the valve 818 is opened to drain produced material. The pressure reduction to one atmosphere inside the reactor 804 initiates coalescence process of organic and inorganic pigment impurities (such as carbon, calcium carbonate, etc.) present along with the polyethylene waste. The pigment impurities coalesce and settle as separate layers through manipulation of the valves

816, 818 and 820. There is no requirement of an additional process to separate the pigment impurities from the produced waxes and grease base stocks. Thus, high to low pressure cycles inside the reactor 804 separates the pigment impurities leaving behind pure waxes and grease base stocks. The slight amount of pressure that is developed inside the reactor 804 pushes the produced products from the reactor 804 into the drum 810.

When the products are poured into the drum 810 at over 400° C., small amounts of hydrocarbon vapors may be produced. A pipe 826 over the drum 810 ensures that the hydrocarbon vapors so formed do not escape into atmosphere and is completely condensed within the drum 810. This hydrocarbon vapors form a protective covering on top of the wax or the grease base stock preventing the wax and the grease base stocks coming in direct contact with the atmosphere and its burning. The products collected in the drum 810 are condensed at 200° C. and is then drained into the tray 828. This process ensures that the liquid products may be drained out at over 400° C., even though such a temperature is significantly above flash point of the waxes or grease base stocks.

The reduction of pressure and removal of the produced material from the reactor 804 may take about 30 minutes. Thus, one cycle of the catalytic depolymerisation may take about two and a half hours. It can be seen that, the depolymerisation reaction is not sensitive to impurities such as polypropylene and polystyrene up to about 10% present along the polyethylene waste. Waxes and grease base stocks of specified quality may be obtained by manipulating process conditions and valves 818 and 820. For example, by manipulating the desired pressure inside the reactor 804, waxes of different grades (e.g., having different melting points) are obtained.

In various embodiments, the processes described in FIGS. 1 through 8 uses a new catalyst which is not deactivated and lasts for over one year of use in the process, thereby making the process economical. The catalyst is stable throughout the reaction temperatures of 300° C.-600° C. and depolymerizes HDPE, LDPE, and LLDPE equally. The catalyst is also unaffected by any pigment impurities. Further, the use of extruder for preheating the polyethylene waste ensures that molten polyethylene waste at high temperatures is fed into the reactor. This may also enable a semi-continuous process in the reactor. During the above-described process, there is a total carbon recovery of the polyethylene waste into desired products, which makes the process eco-friendly.

(b) Polypropylene

Batch depolymerisation of polypropylene resin to lower molecular weight fractions occurs within a reaction temperature range of 300 to 400 degrees Celsius when one (1) to six (6) weight % of the above-described catalyst material. In comparison to other polymeric materials, such as LDPE, LLDPE, and HDPE, undergoes depolymerisation at lower temperatures (generally, 30 to 50 degrees Celsius lower than that for other polymeric materials).

Depolymerisation of polypropropylene, in accordance with the present process, requires lower thermal energy than other processes, and allows for selective production of synthetic hydrocarbon waxes, greases, oils or solvents with yields of greater than 95%. When polypropylene wax is targeted, a yield of 95 to 99% is achieved with 1 to 5 weight % hydrocarbon oil by-product, based on the total weight of the product. Polypropylene wax, generated by the present process, will have a decrease in discoloration and yield a brittle wax (penetration of less than one (1) dmm) and melting points as high as 170 degrees Celsius, which is 20 to 30 degrees Celsius higher than polyethylene-based waxes made through the same process. Variation in the polypropylene wax melting points is achieved by varying reaction pressure, reaction temperature, and the melting point of the source resin. In some embodiments, for example, to obtain polypropylene waxes with melting points above 150 degrees Celsius, polypropylene resins with softening points above 150 degrees Celsius could be used.

If the amount of energy applied to the reaction is excessive (the heat applied to the reaction vessel wall exceeds 500 degrees Celsius), the reaction will proceed in an uncontrollable fashion. As well, the process may, generally, be unable to effect the desired selectivity, and also be unable to achieve desirable yields of the desired product material, such that excessive greases, oils and gases are present in the product material.

In some embodiments, for example, the reactive process is effected in a reaction zone of the reaction vessel. In some of these embodiments, for example, the pressure within the reaction zone is within the range of 10 to 10,000 psi, the temperature within the reaction zone is within the range of 300 to 400 degrees Celsius, the vessel wall temperature is within the range of 400 to 500 degrees Celsius, the amount of catalyst material present within the reaction zone is within the range of 1 to 6 weight %, based on the total weight of the mixture of the polymeric material and the catalyst material, the volume of the mixture of the polymeric material and the catalyst material defines 56% of the total available space within the reaction vessel, and the headspace within the reaction vessel includes air or nitrogen, or may be defined by a vacuum, or substantially a vacuum. Also, in some of these embodiments, a mixer is disposed within the reaction zone, and the mixer is operated at a speed within the range of 45 to 700 rpm. When implementing the process, in accordance with the above-described conditions, a polypropylene wax is produced having a melting point within the range of 100 to 170 degrees Celsius, a penetration within the range of 0 to 10 dmm, and a viscosity within the range of 25 to 2000 cps.

Figure 9:
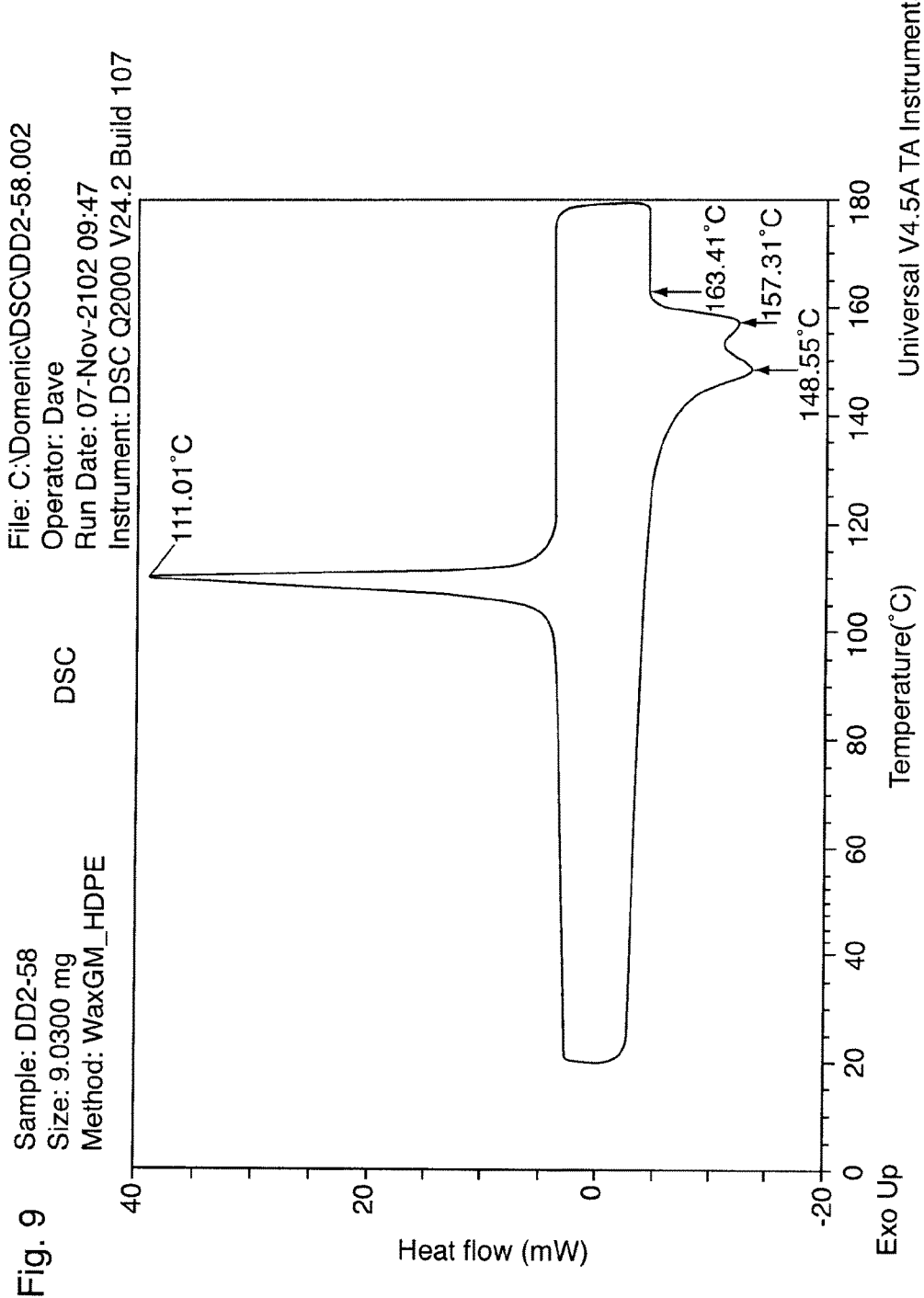
FIG. 9 shows a graph of DSC analysis of the wax obtained from the depolymerisation of polypropylene, according to one embodiment.

FIG. 9 shows a graph of DSC analysis of the wax obtained from the depolymerisation of polypropylene, according to one embodiment.

FIG. 10 is a table illustrating four separate trials which effected production of wax by reacting polypropylene in accordance with an embodiment of the present process. Each one of the trials were carried out under different process conditions.

Although the present embodiments have been described with reference to specific example embodiments, it will be evident that various modifications and changes may be made to these embodiments without departing from the broader spirit and scope of the various embodiments.

What is claimed is:

1. A process for converting a molten polymeric material, comprising:
    providing a molten polymeric material having at least one carbon-carbon double bond; and
    contacting the molten polymeric material with a catalyst material in a reaction zone to cleave at least one carbon-carbon double bond and produce a reaction product,
    wherein the catalyst material includes [Fe—Cu—Mo—P]/$Al_2O_3$ prepared by binding a ferrous-copper complex to an alumina support to generate an intermediate material, and reacting the intermediate material with an Mo- and P-containing heteropolyacid.

2. The process as claimed in claim 1, wherein the contacting further comprises:
heating the reaction zone to a temperature suitable for cleaving at least one carbon-carbon double bond to produce the reaction product and suspending the heating when the pressure within the reaction zone reaches a predetermined pressure.

3. The process as claimed in claim 2,
wherein the predetermined pressure is correlated with at least one property of the reaction product.

4. The process as claimed in claim 1, wherein providing the molten polymeric material comprises heating a polymeric material to produce the molten polymeric material.

5. The process as claimed in claim 2, wherein the reaction product comprises waxes and grease base stocks, further comprising:
varying the predetermined pressure to produce different grades of waxes and grease base stocks.

6. The process as claimed in claim 1,
wherein the molten polymeric material further comprises at least one second polymeric material, wherein the second polymeric material is selected from the group consisting of polyethylene, polypropylene, polyethylene terephthalate, ethylene-vinyl acetate, polyphenylene ether, polyvinyl chloride, polystyrene, lignin, nylon, cellulose, and mixtures thereof.

7. The process as claimed in claim 1, wherein the molten polymeric material further comprises polyethylene.

8. The process as claimed in claim 1, wherein the molten polymeric material further comprises polypropylene.

9. The process as claimed in claim 1,
wherein the molten polymeric material includes waste polymeric material.

10. The process as claimed in claim 1, wherein cleaving the at least one carbon-carbon double bond comprises depolymerisation.

11. A process for converting polymeric material to make waxes or grease base stocks through catalytic depolymerisation, comprising:
preheating the polymeric material to form a molten polymeric material;
catalytically depolymerizing the molten polymeric material in a high pressure reactor in the presence of a catalyst material at a temperature in the range of 300° C. to 600° C. until a pressure in the high pressure reactor reaches a predetermined value in the range of 50 psig to 350 psig, wherein the high pressure reactor comprises heaters and wherein the temperature is maintained using the heaters; and
turning off the heaters and stopping the catalytic depolymerisation when the pressure in the high pressure reactor reaches the predetermined value and wherein the molten polymeric material is converted to a wax or a grease base stock,
wherein the catalyst material is [Fe—Cu—Mo—P]/$Al_2O_3$ prepared by binding a ferrous-copper complex to an alumina support to generate an intermediate material, and reacting the intermediate material with an Mo- and P-containing heteropolyacid.

12. The process as claimed in claim 11, further comprising:
draining the wax or grease base stock into a container when the wax or grease base stock is liquid and is at a temperature above the flash point of the wax or grease base stock, respectively.

13. The process as claimed in claim 11, wherein preheating the polymeric material to form the molten polymeric material comprises:
preheating the polymeric material using an extruder to form the molten polymeric material, wherein the extruder is in fluid communication with the high pressure reactor for feeding the molten polymeric material to the high pressure reactor.

14. The process as claimed in claim 13, further comprising:
continuously feeding the molten polymeric material into the high pressure reactor.

15. The process as claimed in claim 11, further comprising:
varying the predetermined value of the pressure in the high pressure reactor to produce different grades of waxes and grease base stocks.

16. The process as claimed in claim 12, further comprising:
inducing coalescence of pigment particles/impurities in the drained wax or drained grease base stock using a high to low pressure cycle, wherein
(i) the pigment particles/impurities and (ii) the drained wax or drained grease base stock settle in the container as separate layers.

17. The process as claimed in claim 11,
wherein the polymeric material includes polyethylene, polypropylene, polyethylene terephthalate, ethylene-vinyl acetate, polyphenylene ether, polyvinyl chloride, polystyrene, lignin, nylon, or cellulose.

18. The process as claimed in claim 11,
wherein the polymeric material is polyethylene.

19. The process as claimed in claim 11,
wherein the polymeric material is polypropylene.

20. The process as claimed in claim 11,
wherein the polymeric material includes waste polymeric material.

21. A process for converting primary granules of polymeric material to make waxes or grease base stocks through catalytic depolymerisation, comprising:
preheating the primary granules of polymeric material to form molten primary granules of polymeric material;
catalytically depolymerizing the molten primary granules of polymeric material in a high pressure reactor in the presence of a catalyst material at a temperature in the range of 300° C. to 600° C. until a pressure in the high pressure reactor reaches a predetermined value in the range of 50 psig to 350 psig, wherein the high pressure reactor comprises heaters and wherein the temperature is maintained using the heaters; and
turning off the heaters and stopping the catalytic depolymerisation when the pressure in the high pressure reactor reaches the predetermined value and wherein the molten primary granules of polymeric material are converted to a wax or a grease base stock,
wherein the catalyst material is [Fe—Cu—Mo—P]/$Al_2O_3$ prepared by binding a ferrous-copper complex to an alumina support to generate an intermediate material, and reacting the intermediate material with an Mo- and P-containing heteropolyacid.

22. The process of claim 21, further comprising:
draining the wax or grease base stock into a container when the wax or grease base stock is liquid and is at a temperature above the flash point of the wax or grease base stock, respectively;
inducing coalescence of pigment particles/impurities in the drained wax or drained grease base stock using a high to low pressure cycle, wherein (i) the pigment particles/impurities and (ii) the drained wax or drained grease base stock settle in the container as separate layers.

23. The process of claim 21, wherein preheating the primary granules of polymeric material to form the molten primary granules of polymeric material comprises:
preheating the primary granules of polymeric material using an extruder to form the molten primary granules of polymeric material, wherein the extruder is in fluid communication with the high pressure reactor for feeding the molten primary granules of polymeric material to the high pressure reactor; and
continuously feeding the molten primary granules of polymeric material into the high pressure reactor.

* * * * *